Feb. 4, 1930. J. G. ROGAN 1,745,914
SPRINKLER ATTACHMENT FOR HOSE NOZZLES
Original Filed Aug. 6, 1927
Fig. 1.
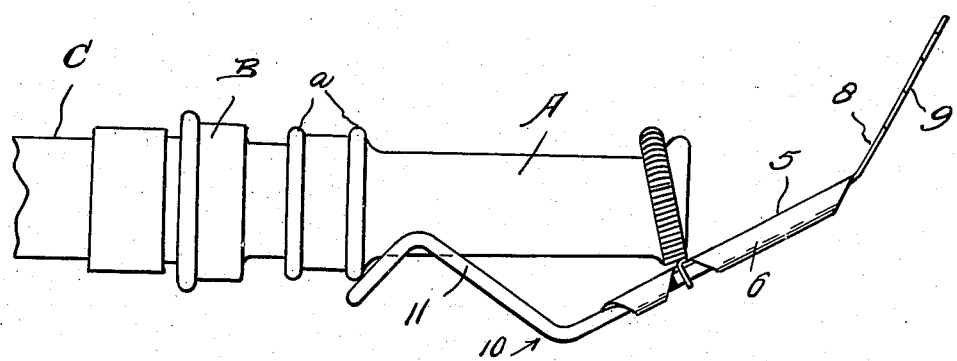
Fig. 2.
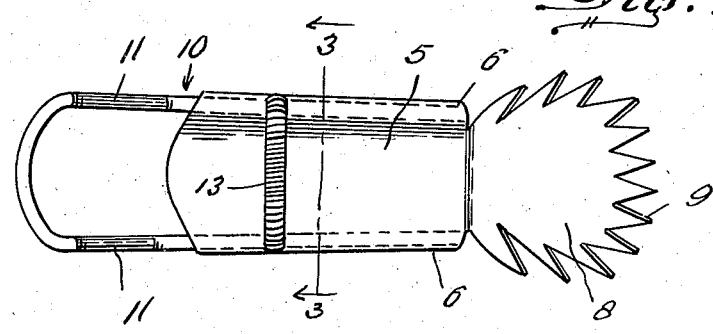
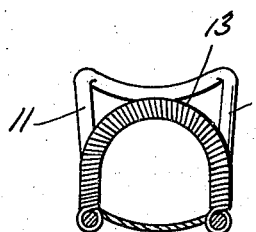
Fig. 3.
Fig. 4.
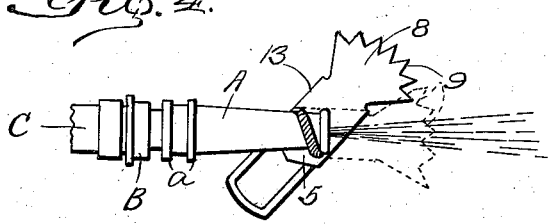
Inventor
J. G. Rogan,
By Clarence A. O'Brien
Attorney Patented Feb. 4, 1930

1,745,914

UNITED STATES PATENT OFFICE

JAMES G. ROGAN, OF SEATTLE, WASHINGTON

SPRINKLER ATTACHMENT FOR HOSE NOZZLES

Application filed August 6, 1927, Serial No. 211,183. Renewed December 13, 1929.

This invention relates to new and useful improvements in hose nozzle sprinkling attachments and aims to provide a highly simplified but improved attachment for generally conventional lawn hose nozzles to cause the projection of the water in a fan-like spray and in a generally upward direction so that the nozzle may be laid upon the lawn without the force of the water directly striking against the lawn and causing the uprooting of the grass and the mutilation of the earth surface which always results in the event a hose is lying upon the lawn and the water passing therethrough.

Furthermore, the invention aims to provide an attachment of this character that may be rapidly and easily arranged upon the hose nozzle and that is so constructed as to remain in rigid engagement with the nozzle so that the hose may be moved from place without requiring the detachment of the sprinkler therefrom.

In the drawing wherein like reference characters indicate corresponding parts throughout the several views:

Figure 1 is a side elevation of a conventional lawn hose nozzle equipped with my improved sprinkler attachment.

Figure 2 is a top plan view of the attachment per se.

Figure 3 is a transverse section taken substantially upon the line 3—3 of Figure 2, and Figure 4 is a view similar to Figure 1, showing the sprinkler attachment disposed on the nozzle in an inoperative position.

In Figure 1 there is disclosed a generally conventional hose nozzle A that is usually formed adjacent its rear end with a pair of spaced ribs $a$—$a$, the extreme rear end of the nozzle being equipped with the usual hose fitting B by reason of which the flexible hose C is attached to said nozzle.

My invention per se consists of a metallic plate 5 of a length and width in predetermined proportion to the length and width of the nozzle with which it is to be associated. This plate 5 is of gradually narrowing width toward its forward end and is formed throughout its length with a transversely extending curvature as clearly disclosed in Figure 3. The longitudinal edges of this plate 5 are turned over to provide sleeves 6—6, each of which is formed adjacent the rear end of the plate with a cut-out 7 for a purpose hereinafter more fully described.

Formed at the forward end of the plate 5 intermediate the sleeves 6—6 is a diagonally forwardly extending generally circular tongue 8, the edge of which is formed with spaced and relatively elongated teeth 9 so that the water striking against said tongue and passing in an outward direction may move therethrough with the result that the water is sprayed in a fan-like manner and in spaced streams.

The invention further consists of a steel wire bail 10 for facilitating the attachment of the inner end of the plate to the nozzle A, this bail being of relatively U-formation in top plan as indicated in Figure 2, the legs of the bail at the ends thereof being on a horizontal plane and adapted for engagement within the rear ends of the plate sleeves 6—6. From said horizontal portions the legs of the bail extend upwardly and rearwardly as at 11—11, while the bight portion 12 of said bail is then bent rearwardly and downwardly for engagement beneath the foremost rib $a$ of the nozzle. Obviously when so disposed with respect to the nozzle A the plate 5 will contact the forward end of the nozzle at the bottom surface thereof and extend diagonally with respect to the horizontal axis of the nozzle the forward end of the plate extending upwardly in front of the discharge end of the nozzle.

Furthermore, there is attached to the horizontal portions of the bail legs through the openings 7 in the plate sleeves 6—6, the ends of a retractile coil spring 13, which is provided for engagement over the nozzle A directly in back of the flared end thereof and inclined with respect to the vertical axis of the nozzle as clearly indicated in Figure 1.

The spring 13 furthermore provides a means whereby the sprinkler attachment may be disposed in an inoperative position on the hose nozzle so as to permit the use of the hose nozzle in the usual manner without necessitating the removal of the sprinkler attachment from the nozzle. In Figure 4 of the drawing, there is illustrated the manner in which the sprinkler attachment is disposed in an inoperative position upon the hose nozzle, and it will be observed that the plate 5 extends along the side of the nozzle in a substantially vertical position, while the coil spring 13 is slightly distorted and is disposed spirally around the nozzle. The tension of the spring will maintain the spray nozzle attachment in said inoperative position.

It will thus be seen that I have provided a highly novel, simple and extremely efficient sprinkler attachment for hose nozzles that is well adapted for all the purposes heretofore designated, even though I have herein shown and described the invention as consisting of certain detail structural elements it is nevertheless to be understood that some changes may be made therein without affecting the spirit and scope of the appended claims.

Having thus described the invention, what I claim as new and desire to secure by Letters Patent is:—

1. In a sprinkler attachment for hose nozzles wherein a rib is formed on the rear portion of the nozzle, a plate adapted for disposition beneath the nozzle adjacent the discharge end thereof and at an angle to the longitudinal axis of said nozzle, means at the forward end of the plate for causing a fan like spray of water to be discharged from the nozzle, the longitudinal edges being rolled to form sleeves, each sleeve being cut out at its intermediate portion, a substantially U-shaped bail, the legs of which have their forward free ends disposed within the respective sleeves, the inner end portions of the legs rearward of the plate being disposed upwardly, the bight portion of the U-shaped bail being disposed downwardly for engagement with the aforementioned rib, the upwardly disposed portions of the legs being adapted for engagement with the opposite sides of the nozzle, and means extending around the outer end portion of the nozzle for attachment to the respective leg portions at the cut out portions of said sleeves to secure the attachment on the nozzle.

2. In a sprinkler attachment for hose nozzles wherein a rib is formed on the rear portion of the nozzle, a plate adapted for disposition beneath the nozzle adjacent the discharge end thereof, and at an angle to the longitudinal axis of said nozzle, means at the forward end of the plate for causing a fan like spray of water to be discharged from the nozzle, the longitudinal edges being rolled to form sleeves, each sleeve being cut out at its intermediate portion, a substantially U-shaped bail, the legs of which have their forward free ends disposed downwardly for engagement with the aforementioned rib, the upwardly disposed portions of the legs being adapted for engagement with the opposite sides of the nozzle, and means extending around the outer end portion of the nozzle for attachment to the respective leg portions at the cut out portions of said sleeves to secure the attachment on the nozzle, said last mentioned means comprising a retractile coil spring, said spring permitting the attachment to be disposed in an inoperative position on said nozzle.

In testimony whereof I affix my signature.

JAMES G. ROGAN.